US009868653B2

(12) United States Patent
Denvir et al.

(10) Patent No.: US 9,868,653 B2
(45) Date of Patent: Jan. 16, 2018

(54) SYSTEM AND METHOD FOR TREATING WATER SYSTEMS WITH HIGH VOLTAGE DISCHARGE AND OZONE

(71) Applicant: NCH Corporation, Irving, TX (US)

(72) Inventors: Adrian J. Denvir, Richardson, TX (US); David F. Vela, Irving, TX (US); Matt C. Holloway, Ft. Worth, TX (US)

(73) Assignee: NCH Corporation, Irving, TX (US)

( * ) Notice: Subject to any disclaimer, the term of this patent is extended or adjusted under 35 U.S.C. 154(b) by 748 days.

(21) Appl. No.: 14/260,605

(22) Filed: Apr. 24, 2014

(65) Prior Publication Data
US 2014/0326681 A1 Nov. 6, 2014

Related U.S. Application Data

(60) Provisional application No. 61/818,229, filed on May 1, 2013.

(51) Int. Cl.
 C02F 1/32 (2006.01)
 C02F 1/46 (2006.01)
 (Continued)

(52) U.S. Cl.
 CPC .............. *C02F 1/4608* (2013.01); *C02F 1/32* (2013.01); *C02F 1/34* (2013.01); *C02F 1/36* (2013.01);
 (Continued)

(58) Field of Classification Search
 CPC .......... C02F 1/4672; C02F 2201/46105; C02F 2303/04; C02F 2103/02; B01F 3/04241;
 (Continued)

(56) References Cited

U.S. PATENT DOCUMENTS 1,764,279 A 6/1930 Osborn
2,470,118 A 5/1949 Trevor, Jr.
(Continued)

FOREIGN PATENT DOCUMENTS

CN 201923870 8/2011
DE 10335880 3/2005
(Continued)

OTHER PUBLICATIONS

Locke et al., Electrohydraulic Discharge and Nonthermal Plasma for Water Treatment, Ind. Eng. Chem. Res. 2006, 45, 882-905.
(Continued)

*Primary Examiner* — Walter D. Griffin
*Assistant Examiner* — Cameron J Allen
(74) *Attorney, Agent, or Firm* — Ross Barnes LLP; Robin L. Barnes; Monty L. Ross

(57) ABSTRACT

A system and method for treating flowing water systems with a plasma discharge to remove or control growth of microbiological species. The system and method protect other components of the water system from being damaged by excess energy from the electrohydraulic treatment. The system and method also recycle ozone gas generated by a high voltage generator that powers the plasma discharge to further treat the water. A gas infusion system upstream of or inside a plasma reaction chamber may be used to create fine bubbles of ozone, air, or other gases in the water being treated to aid in plasma generation.

7 Claims, 5 Drawing Sheets

(51) Int. Cl.
*C02F 1/34* (2006.01)
*C02F 1/36* (2006.01)
*C02F 1/48* (2006.01)
*C02F 1/78* (2006.01)
*C02F 103/02* (2006.01)

(52) U.S. Cl.
CPC ............... *C02F 1/487* (2013.01); *C02F 1/78* (2013.01); *C02F 2103/023* (2013.01); *C02F 2201/4615* (2013.01); *C02F 2201/46135* (2013.01); *C02F 2201/46175* (2013.01); *C02F 2201/483* (2013.01); *C02F 2303/04* (2013.01); *C02F 2303/10* (2013.01); *C02F 2303/26* (2013.01); *C02F 2305/023* (2013.01); *Y02W 10/30* (2015.05)

(58) Field of Classification Search
CPC .... B01F 2003/04943; B01F 2215/0052; B01F 2003/04886
See application file for complete search history.

(56) References Cited

U.S. PATENT DOCUMENTS

| | | | |
|---|---|---|---|
| 3,505,533 A | 4/1970 | Bernstein et al. | |
| 3,845,322 A | 10/1974 | Aslin | |
| 4,917,785 A | 4/1990 | Juvan | |
| 5,311,067 A | 5/1994 | Grothaus et al. | |
| 5,464,513 A | 11/1995 | Goriachev et al. | |
| 5,621,255 A | 4/1997 | Leon et al. | |
| 5,630,915 A | 5/1997 | Greene et al. | |
| 5,879,641 A | 3/1999 | Conrad et al. | |
| 5,965,093 A | 10/1999 | Adams | |
| 6,019,031 A | 2/2000 | Qin et al. | |
| 6,060,791 A | 5/2000 | Goerz et al. | |
| 6,145,469 A * | 11/2000 | Teranishi | C23C 14/34 118/723 E |
| 6,166,459 A | 12/2000 | Holland et al. | |
| 6,228,266 B1 | 5/2001 | Shim | |
| 6,274,053 B1 | 8/2001 | Conrad | |
| 6,325,916 B1 | 12/2001 | Lambert et al. | |
| 6,558,638 B2 | 5/2003 | Zadiraka et al. | |
| 7,209,373 B2 * | 4/2007 | Oicles | H02M 3/3376 307/108 |
| 7,394,171 B2 | 7/2008 | Loppacher | |
| 7,498,697 B2 | 3/2009 | Hofmann | |
| 2003/0026877 A1 | 2/2003 | Ruan et al. | |
| 2004/0000476 A1 | 1/2004 | Cho et al. | |
| 2006/0049115 A1 * | 3/2006 | Birkbeck | C02F 1/4674 210/748.17 |
| 2006/0060464 A1 | 3/2006 | Chang | |
| 2006/0157401 A1 * | 7/2006 | Fuerst | H01R 13/514 210/323.1 |
| 2007/0272621 A1 | 11/2007 | Dresty | |
| 2009/0095352 A1 | 4/2009 | Kovalcik | |
| 2009/0297409 A1 | 12/2009 | Buchanan et al. | |
| 2010/0025240 A1 * | 2/2010 | Muller-Siebert | B02C 19/18 204/421 |
| 2010/0072143 A1 | 3/2010 | Jacobs et al. | |
| 2010/0126940 A1 | 5/2010 | Ryu et al. | |
| 2010/0219136 A1 | 9/2010 | Campbell et al. | |
| 2011/0303532 A1 * | 12/2011 | Foret | A23B 4/015 204/269 |
| 2012/0160692 A1 | 6/2012 | Seok et al. | |
| 2013/0038970 A1 * | 2/2013 | Hughes | C02F 1/487 361/56 |
| 2013/0062314 A1 | 3/2013 | Curry et al. | |
| 2014/0014516 A1 | 1/2014 | Kumagai et al. | |

FOREIGN PATENT DOCUMENTS

| | | | |
|---|---|---|---|
| DE | 102011014329 | 7/2012 | |
| EP | 0750396 | 8/2003 | |
| EP | 1743872 | 1/2007 | |
| EP | 2072471 | 6/2009 | |
| EP | 2363380 | 9/2011 | |
| GB | 1133643 | 4/1966 | |
| JP | 3983282 | 9/1997 | |
| JP | 2000093967 | 4/2000 | |
| JP | 2003062579 | 3/2003 | |
| JP | 2007207540 | 8/2007 | |
| JP | 2009255027 | 11/2009 | |
| JP | 2010523326 | 7/2010 | |
| WO | WO199831636 | 7/1998 | |
| WO | WO 2012157248 A1 * | 11/2012 | ............ C02F 1/4608 |

OTHER PUBLICATIONS

Gupta, et al., The Potential of Pulsed Underwater Streamer Discharges as a Disinfection Technique, IEEE Transactions on Plasma Science, vol. 36, No. 4, Aug. 2008, 1621-1632.

Yang, Plasma Discharge in Water and Its Application for Industrial Cooling Water Treatment, Thesis, Jun. 2011.

Van Heesch, et al., A Fast Pulsed Power Source Applied to Treatment of Conducting Liquids and Air, IEEE Transactions on Plasma Science, vol. 28, No. 1, Feb. 2000.

Yang, et al., Mineral Fouling Control by Underwater Plasma Discharge in a Heat Exchanger, Journal of Heat Transfer, vol. 133, May 2011.

Yang, et al., Plasma Discharge in Water, Advances in Heat Transfer vol. 42, 2010.

Jayaram, Pulse Power applied to process industry and environment; Proceedings/IEEE GCC conference; Urumchi, Xinjiang, China (2007).

* cited by examiner

SYSTEM AND METHOD FOR TREATING WATER SYSTEMS WITH HIGH VOLTAGE DISCHARGE AND OZONE

CROSS-REFERENCE TO RELATED APPLICATIONS

This application claims the benefit of provisional U.S. Application Ser. No. 61/818,229, filed on May 1, 2013.

BACKGROUND OF THE INVENTION

1. Field of the Invention

This invention relates to a system and method for treating flowing water systems using a high voltage discharge to generate plasma and using the ozone by-product from the high voltage generation, particularly useful in treating cooling tower or other recirculating or closed-loop systems.

2. Description of Related Art

Anthropogenic water systems are critical components commonly found in most of the world's energy producing facilities, industrial and manufacturing plants, hospitals, and other institutional complexes and buildings. These systems consume around 700 billion gallons of water annually with a cost of $1.8 billion in make-up water and sewage handling costs alone. All of these anthropogenic water systems require some form of treatment, either chemical or non-chemical, to control the build-up of scale, biofilm and other corrosion by-products on the important heat transfer surfaces that are necessary for efficient system operation.

For water systems involving heat exchange, such as cooling towers and boilers, effective treatment to remove these contaminants and to prolong the amount of time before the systems are re-contaminated can save significant amounts of money. An effective and thorough treatment may save costs for labor and treatment chemicals by reducing the frequency of periodic treatments or reducing the amount of chemicals needed for routine maintenance and/or periodic treatments. Such a treatment may also save on energy costs through the operation of clean heat exchange surfaces. Fouling of heat exchange surfaces costs U.S. industry hundreds of millions of dollars every year and is directly related to an increase in energy consumption of almost 3 quadrillion Btus (quads) annually.

To maximize the water usage and minimize waste, many of these systems employ a series of chemical treatments that protect the system against scaling, biofilm formation, and corrosion. These chemical treatments allow the water to be reused and recycled a number of times before it becomes necessary to discharge the water and replace it with fresh water. Increasing the duration for which the water may be circulated significantly reduces the amount of water that is discharged to the sewage system and minimizes the amount of make-up water that is needed to replace the bleed off. However, many chemical treatment compositions and methods may damage the components of the water system being treated as the chemicals used are highly corrosive. There is also an environmental down side to harsh chemical treatments, including growing concern over the formation of toxic disinfection-by-products such as trihalomethanes, haloacetonitriles, and halophenols that have been identified in the discharge water being released into the environment. It is estimated that there are 536 billion pounds of water treatment chemicals discharged annually as a result of cooling tower treatments, which may impact a variety of species living in or near areas and water-ways receiving the discharge or bacterial components of sewage treatment plants receiving the discharge.

In an attempt to minimize the environmental impact associated with some chemical treatments, many water treatment companies, and more importantly their customers, are looking to use non-chemical based water treatment technologies to maintain the performance of their systems. There are currently about 30 non-chemical treatment devices or water conditioning technologies that are commercially available for use in both commercial and residential water systems. These systems can be divided into three categories: (1) Indirect chemical producers that use a benign or safe chemical additive such as air or salt to produce the biocide. These systems include ozone generators and electrochemical hypochlorite generators and mixed oxidant generators. (2) Direct chemical producers that generate the active chemical species from direct interaction on the water. These devices use mechanical processes, such as hydrodynamic cavitation or sonic cavitation, to produce hydroxyl radicals along with localized areas of high temperatures and pressures in the water. Other types of devices that would fit into this category are ultraviolet light systems. (3) Electrical and Magnetic devices, including plasma generation, use induced electrical and magnetic fields to induce ion migration and movement that can result in cell death through electroporation, or ion cyclotron resonance effects within the cell wall. Out of all of these technologies the electrical and magnetic devices are the most common; however, they are the technologies that have the least rigorous scientific support. The direct and indirect chemical approaches have more scientific credibility; however, this greater understanding may have limited their potential applications and hence they have not been able to capture a larger portion of the market share.

The application of high voltage discharge and generating plasma within water is known in the prior art. For example, an article published by B. R. Locke et al. (Ind Eng. Chem Res 2006, 45, 882-905) describes electrode configuration and geometry, the pulsed arc vs. pulsed corona, and the chemical species that are formed during an electrohydraulic discharge and non-thermal plasma in water discharge process. The article addresses many of the fundamental issues related to using this technique for water treatment, but it fails to address the practical applications related to water treatment in an industrial, commercial, or residential environment, especially related to the need for multiple ground points to minimized the effect of the electromagnetic radiation released into the water and surrounding atmosphere.

It is also know to use ozone gas to treat water. For example, in an article by Gupta et al. (S. B. Gupta, IEEE Transactions on Plasma Science, 2008, 36, 40, 1612-163) the use of an advanced oxidation process resulting from pulsed discharges in water is described. The process described by Gupta uses oxygen gas or ozone gas supplied into the discharge reactor from secondary independent sources (and not from the high voltage generator). They also report that system output and performance is highly dependent on solution conductivity. For systems where water conductivity can be high, such as in cooling tower and closed loop applications, higher voltage discharges are needed and this in turn creates problems with increased electromagnetic radiation.

There are also several prior art patents or published patent applications that address plasma generation for various purposes, including water treatment or purification, such as U.S. Patent Application Pub No. 2009/0297409 (generation of flow discharge plasmas at either atmospheric or higher pressures), U.S. Patent Application Pub No. 2006/0060464

(generation of plasma in fluids, in particular formed within the bubbles generated and contained in an aqueous medium), U.S. Pat. No. 6,558,638 (using high voltage discharge to treat liquids, while incorporating a gas delivery means for generating bubbles in the discharge zone), and U.S. Patent Application Pub No. 2010/0219136 (pulsed plasma discharge to treat fluid such as water at a flow rate of 5 gpm while consuming only 120-150 Watts of power).

The prior art teaches that high voltage discharges in water can generate chemically active species, exhibit physical effects, and control water chemistry. However, the known prior art does not address the how to apply this technology of using plasma discharge to treat larger volumes of flowing water in an industrial, commercial or residential setting over longer periods of time without damaging other components of the water system, including the controllers and monitors that are needed for scale and corrosion control, blowdown, and water conservation measures.

SUMMARY OF THE INVENTION

This invention relates to a system and method using non-chemical technologies to treat flowing water systems, such as cooling towers and closed-loop or recirculating water systems. This treatment involves generating a high frequency and high voltage discharge between two electrodes submerged in the water being treated. With each discharge between the electrodes there is a number of long lived oxidative chemicals (ozone, hydrogen peroxide) and short lived oxidative chemicals (super oxides, hydroxyl radicals, and hydrogen radicals) generated, UV radiation is also generated, together with sonic shockwaves. These effects are well known in the prior art. However, it is not previously known to utilize an electromagnetic or electrolysis system that captures the excess energy produced by the high voltage discharge (which is normally wasted). According to one embodiment of the invention, the system uses this excess energy to further condition and treat the water by allowing the current to flow through wire loops connecting water system piping to a ground to generate a magnetic field in the water. This magnetic field has been shown to have a beneficial effect in water treatment and avoids the damaging effects of the large amounts of electromagnetic radiation throughout the entire water system have on the electronic control systems used to measure conductivity, pH, biological activity, as well as to control pumps and other critical system components that are typically found with systems that directly generate a high voltage discharge into a water supply.

To use a high voltage discharge without having multiple ground points in the water or adequate shielding around the high voltage components severely limits the applicability of the existing prior art. Another embodiment of the invention includes the use of a micro-bubble generator that introduces a fine stream of micro-bubbles into the high voltage discharge chamber. In order to maximize the reaction area for the high voltage discharges in highly conductive water power supplies with the capability of generating over 200 kV are required. A by-product in the operation of these power supplies is the production of ozone gas that must be removed from the system. Our patent teaches that this ozone gas produced as a by-product of the high voltage power supply can be introduced into the high voltage chamber as a fine dispersion of micro-bubbles to make a zone where oxidation reactions are enhanced. Additionally the high voltage chamber can incorporate a fluid handling system that generates micro-bubbles within the high voltage discharge zone through sonication or hydrodynamic cavitation. Finally our patent teaches using a pulsed high voltage discharge regimen where the high voltage discharge can be applied in specific time increments to prevent over heating of the water, wiring, or other critical power supply components.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
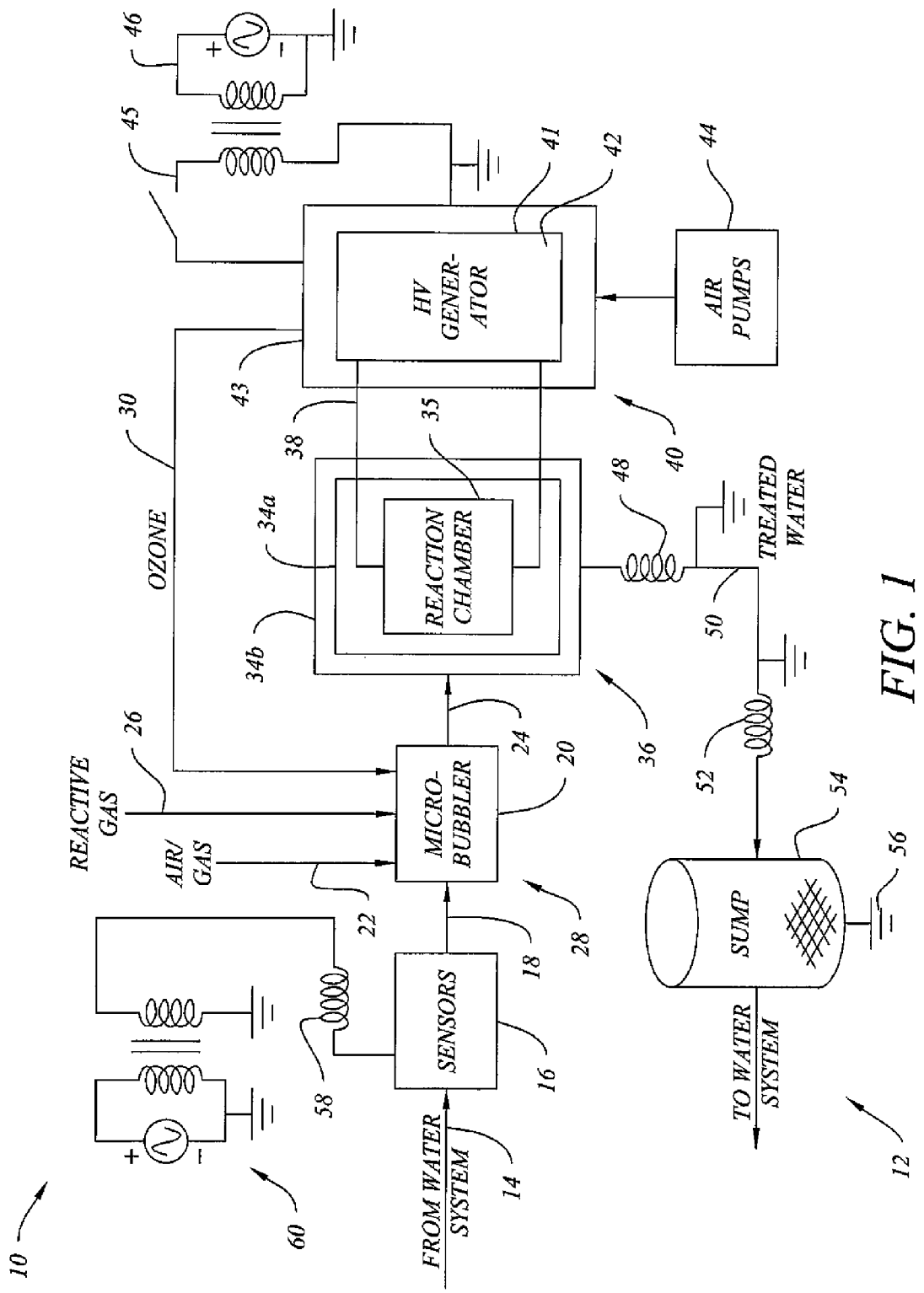
FIG. 1 is a schematic view of one preferred embodiment of a system according to the invention.

A preferred embodiment of a treatment system according to the invention is depicted in FIG. 1. Treatment system 10 preferably comprises a gas infusing system 28, a plasma reaction chamber 36, a high voltage generator 40, power system 46, and various component protection devices. Treatment system 10 is easily added to an existing water system 12. Water system 12 can be any residential, commercial or residential water system, particularly those used for cooling applications and recirculated water systems, such as cooling towers. Water system 12 includes well known components that are not depicted in FIG. 1. A water stream 14 from the water system 12 being treated passes through various sensors 16 commonly used in monitoring water systems, such as pH sensors, temperature, and conductivity. Depending on the size of the water system 12 and volume of water flowing through the water system 12, all of the water in the system may pass through the treatment system 10 or only a portion or side stream may pass through treatment system 10.

Water stream 18 preferably flows through gas infusing system 28, which infuses water stream 18 with fine bubbles of air and/or gas. Preferably, gas infusing system 28 comprises one or more micro-bubbler devices 20, where air or gas 22, reactive gas 26, and/or ozone 30 are introduced into the water stream as fine bubbles upstream of plasma reaction chamber 36. Reactive gases, such as ozone, mono-atomic oxygen, meta-stable singlet delta oxygen, vapor phase hydrogen dioxide, chlorine gas, chlorine dioxide gas, may also be used to achieve maximum removal of microbiological species from water system 12. The use and selection of such gases will depend on water conditions within water system 12. It is not required to add air, ozone, or other gas streams to water stream 18, or that such be added as micro-bubbles, but the micro-bubbles aid in plasma generation and the ozone gas or reactive gas also serve to treat the water of the water system. If bubbles are added, stream 24, infused with bubbles feeds plasma reaction chamber 36, otherwise stream 18 feeds plasma reaction chamber 36.

In one preferred embodiment gas infusing system 28 comprises a venturi system for infusing a fine bubble dispersion of air/gas, reactive gas, and/or ozone into water stream 18 to produce water stream 24. The venturi input is located upstream of the high voltage reaction chamber 36 and introduces micro-bubbles of one or more of these gases into the high voltage discharge within the reaction chamber 36. In another preferred embodiment the micro-bubbles are generated by incorporating a hydrodynamic cavitation system that introduces a highly dispersed suspension of micro-bubbles produce by the hydrodynamic cavitation process into a reaction zone within reaction chamber 36. In a third preferred embodiment, a venturi system and hydrodynamic cavitation system are used together. The combination has the advantage of generating a synergistic environment for optimized reaction kinetics and active species generation. In a fourth preferred embodiment, the high voltage reaction chamber 36 could be coupled with a plurality of sonicating probes that could generate micro-bubbles in situ within a high voltage discharge zone within chamber 36, again providing synergistic reaction performance. Finally in a fifth preferred embodiment, one or more of these gases could be venturied into the high voltage reaction zone together with the micro-bubbles being generated by the sonicating probes. The introduction of micro-bubbles using any of these systems or devices, the components and applications of which are well known in the art, further aid in plasma generation because the dielectric breakdown strength of air is less than that of water. As the plasma breakdown is initiated in air, ionized electrons from the air will then carryover and begin electron ionization in the water molecules.

Reaction chamber 36 comprises a sealed, water-tight housing 35 surrounded and shielded by an inner dielectric barrier layer 34a and outer ground shield 34b. The dielectric barrier 34a is a non-conductive layer that prevents arcing to the ground layer 34b, which is a conductive outer layer tied to the ground. The dielectric barrier 34a and ground shield 34b reduce electromagnetic interferences radiating from the reaction chamber 36. If reaction chamber 36 is not shielded, sensitive electronic equipment may be damaged by the plasma generated within the chamber 36. Within reaction chamber 36 are disposed a high voltage electrode and a ground electrode which generate a plasma discharge within chamber 36 as voltage generated in high voltage generator 40 is transmitted to the high voltage electrode within chamber 36. These components for generating a plasma discharge are well known to those of ordinary skill in the art. The shape and configuration of reaction chamber 36, housing 35, and the high voltage and ground electrodes within reaction chamber 36 are not critical and any known shape and configuration may be used. Another ground 48 is also disposed in contact with ground layer 34b surrounding housing 35, which is needed to generate the plasma discharge in reaction chamber 36. A highly insulated high voltage wire 38 connects the high voltage generator 40 with the high voltage electrode in reaction chamber 36. Wire 38 is preferably insulated with a high strength dielectric to prevent arcing to other electronic devices, metal structures, or people/operators. Treated water stream 50 exits the reaction chamber 36 and returns to sump 54 (particularly where water system 12 is a cooling tower) or other components or piping of water system 12 to be recirculated through the system. Inlet and outlet couplings for water streams 24 and 50 into and out of chamber 36 should be grounded.

High voltage generator 40 may generate a high frequency, high voltage discharge that exceeds 200 kV on each discharge step. The high voltage generator 40 preferably comprises a Marx ladder or Marx generator 42 disposed within a spark gap chamber 41 within an outer housing 43 that includes a dielectric barrier to isolate the Marx ladder 42 from the surrounding environment and prevent arcing from the internal components to nearby metal structures, electrical outlets, and other monitoring and control systems. To be effective in treating conductive waters similar to those seen in traditional cooling towers or closed loop systems, the high voltage generator 40 is preferably capable of a voltage output of 200 kV for an electrode gap of around 5 mm between the high voltage discharge electrode and the ground electrode in the reaction chamber 36. Although other gap distances may be used with modifications that would be understood by one of ordinary skill in the art, a gap distance of around 5 mm is preferred. This is preferred because a larger gap distance requires an increase in output voltage, which can introduce additional issues, such as component failure in the high voltage generator 40, and a smaller gap distance reduces the volume of water being exposed to the plasma discharge.

In one preferred embodiment, the high voltage generator 40 comprises a stage 1 low voltage component that takes the 110V output from a typical wall outlet and generates a 40 kV DC signal. This is achieved by a Zero Volt switching circuit that pulses the input from a flyback transformer. The number of turns on the transformer can be increased or decreased to change the output voltage of the flyback transformer. An advantage of using a Zero Volt Switching driver circuit is that it features a high noise immunity, that is not susceptible to electromagnetic interference that is created in pulsed power systems. Digital or other circuits can also be used, but they are more sensitive to outside interference generated by the plasma reaction chamber 36 than a Zero Volt Switching driver. To protect the electronics from the high voltage output this is constructed as a separated shielded entity. The signal from the stage 1 low voltage component is used to charge a capacitor bank in the Marx generator 42, which has the capacitors assembled in parallel. When the capacitor bank reaches the discharge limit, it triggers a cascading discharge event between spark gaps in a Marx ladder so as the terminal voltage is greater than 200 kV between the discharge and ground electrode.

Air pumps 44 or other devices to pressurize or blow air are preferably integrated into high voltage generator 40, but may also be external to generator 40 and connected with appropriate conduit to permit air flow into generator 40. Air pumps 44 blow air through the high voltage generator 40 to quench the electrodes of the Marx ladder 42, which aids in increasing electrode lifetime. Air pumps 44 flush air across the electrodes and out of the spark gap chamber 41. Ozone gas 30 generated from the spark gap chamber 41 is withdrawn from high voltage generator 40 and preferably recycled back to be injected or infused into water stream 18 to provide further water treatment. Ozone gas generated from the Marx ladder is typically considered a waste product, but it is beneficially used according to the invention as a source of water treatment. Most preferably, the ozone gas 30 is venturied into water stream 18 at or near an inlet into reaction chamber 36. This permits the introduction of ozone into the water supply and also aerates the water stream 18 with fine micro-bubbles to form feed stream 24.

Treatment system 10 also comprises a power system 46 and various protective devices to protect the components of the water system from excess voltage produced. Power system 46 preferably comprises an uninterruptable power supply or isolation transformer, which reduces any transient voltage spikes from entering the power supply of the building in which water system 12 is housed. This also isolates the high voltage generator 40 from other electronic components of the building and the water system 12, such as sensors 16 which have a separate, uninterruptable power supply or isolation transformer 60. A grounded metal component 56 is preferably placed in a water reservoir for the water system 12 (such as sump 54 in the case of a cooling tower). Grounded metal component 56 is preferably a piece of metal or mesh with a large surface area, but other shapes and configurations may be used. This grounded component reduces or eliminates electromagnetic interference through the water. Electromagnetic interference suppressors 58 are preferably connected to or clamped on electronic components of water system 12, particularly any sensors (such as sensors 16) that will be used to monitor water qualities—such as conductivity, temperature, and pH. Other grounding devices, such as 52, may be added as necessary to other reservoirs or piping within water system 12 or connecting water system 12 with treatment system 10. In one preferred embodiment, grounding device 52 comprises a screw inserted into a wall of a pipe through which water in the water system is flowing, with a length of wire connected at one end to the head of the screw and wrapped around the pipe several times, with the other end connected to ground. Other grounding devices or configurations may also be used as will be understood by those of ordinary skill in the art. Typically, these grounding devices will be placed on or near specific types of equipment, such as a corrater (corrosion monitoring system), chemical controller, flow controller, conductivity probe, or will be spaced out throughout the water system with 2-4 devices used in most large water system applications. These grounding devices serve to protect the components of water system 12 and also allow the energy from the multiple ground points to be harvested and stored in a capacitor or inductor. The harvested and stored energy may be used to generate low level energetic fields (electromagnetic or electrochemical) that provide further benefits to the water treatment process. Electromagnetic fields have been used to prevent chemical scale formation and have been used to induce electroporation and ion cyclotron resonance, which have been shown to have antimicrobial properties. Electrochemical reactions can generate areas of localized high and low pH and can induce electroporation as well. They may also generate low level electromagnetic fields locally within the water system without storing the energy. For example, with a wrapped wire device around a pipe in the water system as described above, each time a pulse (from the plasma) is sinked to ground, a current will flow through the wire loops around the pipe to generate a magnetic field in the water flowing through the pipe at that location.

Treatment system 10 is preferably run using a timer or other controller device in which the system can be activated/deactivated in periodic intervals, preferably around 15 minute intervals, to reduce overall system heating and increase efficiency. As the system heats up, more energy will be dissipated in the Marx generator 40, which results in more charging losses and less energy being available for plasma generation. Allowing the system to cool during periodic deactivation reduces charging losses and increases efficiency. Periodic activation/deactivation will also allow the ozone from the spark gap chamber to be flushed out on a regular basis and maintain a pulsed arc discharge over the greater than 5 mm electrode gap. In order to operate the system safely it is necessary to power the system through a switch box 45 that features a ground fault circuit interrupt. This emergency stop system will trigger if the current flowing from the device does not match the current sinking into the device.

The following are examples wherein a treatment system 10 according to various embodiments of the invention were tested.

Example 1A. Direct Discharge into an Unprotected System

In the first set of experiments, a pilot cooling tower was used. Components of this experimental system that correspond with the systems depicted in FIG. 1 are labeled according to the reference numbers in FIG. 1. A cooling tower (total volume 100 L) water system 12 was charged with water and the system was set to circulate. The water chemistry was monitored using an Advantage Control system and biological monitoring as performed using two in-house biological monitoring systems and a ChemTrak biological monitor. These systems are typically found or are similar to those typically found in larger scale commercial or industrial cooling tower operations. To incorporate the high voltage generator system into the cooling tower, a side-stream flow (stream 18) was pulled from the heat exchanger rack via a mechanical ball valve and 12 feet of 0.75 inch diameter clear flexible PVC tubing. This valve allows the system to change flow dynamics based on the specific composition of the water being treated. For example, changing the flow rate past the venturi changes how the gas bubbles are distributed into the water and this in turn can change the form of the plasma generated at the high voltage discharge electrode. Also volume and flow rate are important in terms of treatment of the entire system water for biological control using directed high voltage discharge because successful treatment depends not only on the amount of energy being delivered, but also the treatment time. Since bacteria are constantly replicating in a typical system within a large volume of water, it is important to achieve a high enough flow rate through the reaction chamber 36 in order to ensure that the entire volume of system water is repeatedly treated or cycled through the high voltage discharge zone to increase total treatment time (the total amount of time a column of water with biological constituents in in contact with the high voltage discharge).

Figure 2A:
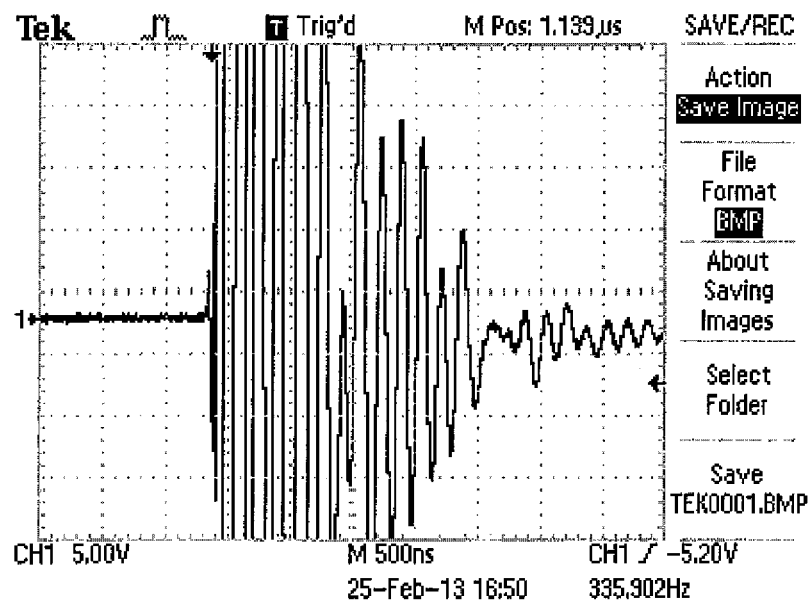
FIGS. 2A and 2B are graphs showing electromagnetic fields measured in one experiment when an embodiment of the invention was not applied.
Figure 2B:
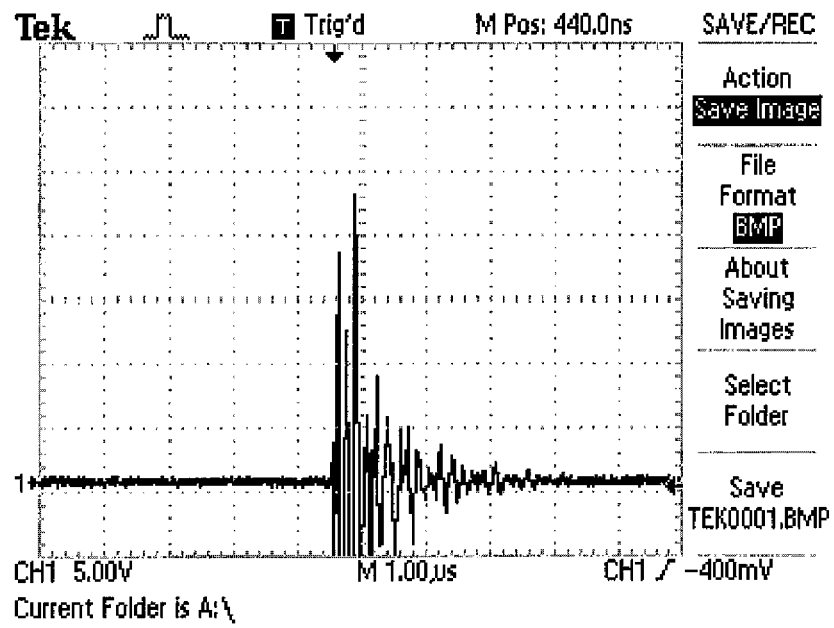

Using this setup on the pilot cooling towers allows for a maximum of 2 gpm side-stream flow. This tubing was connected to a plasma chamber 36 via a threaded polyethylene barbed fitting. At the outlet of the reaction chamber, 5 feet of clear PVC tubing is used to drain the water exiting the reaction chamber (stream 50) into the sump 54. None of the grounding points (such as ground 52 and 56) described with respect to a preferred embodiment above were put in place. The reaction chamber 36 was connected to a high voltage generator 40. The unit was activated and a pulsed spark discharge in water with 1,500 μmhos conductivity was observed over a 1 cm electrode gap. Immediately upon activating the high voltage generator 40, flow control relays of water system 12 began to activate off and on, cutting off power to the water system 12. The electronics in the Advantage Controller over loaded and shut the system down and the biomonitor output (located on the other side of the room from the high voltage generator 40) overloaded and shut off. FIGS. 2A and 2B show the electromagnetic fields measured in the water with the plasma unit on in this test embodiment, with water flow and no water flow with the electromagnetic fields traveling through the water in both cases. It can be seen that when the water is flowing (FIG. 2A) there is a high resonance electromagnetic pulse penetrating the water circulating through the system. It can be seen that even when the water is not flowing (FIG. 2B) there was still a measurable electromagnetic field resulting for the high voltage discharge.

Example 1B. Direct Discharge into a Protected System

Figure 3:
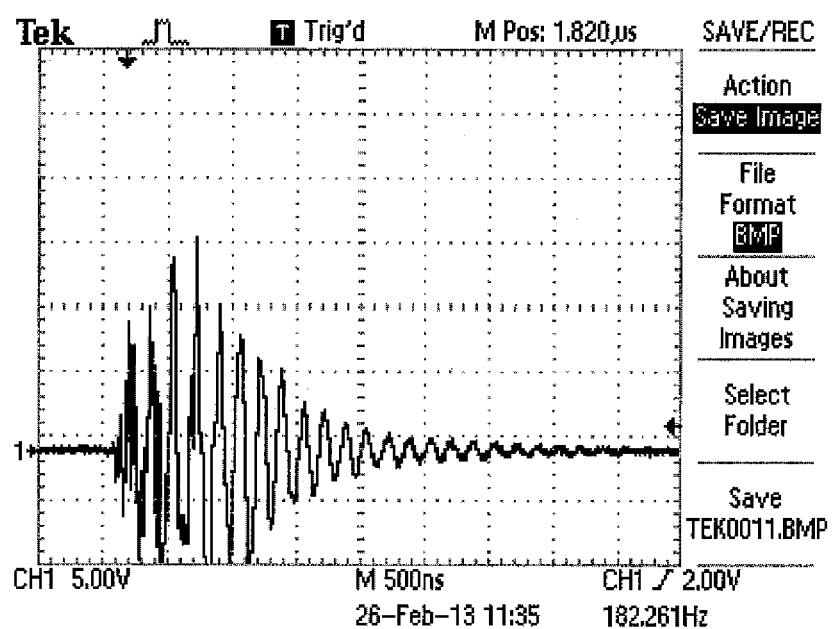
FIG. 3 is a graph showing electromagnetic fields measured in another experiment using a preferred embodiment of the invention.

The experiment of 1A was repeated, but with a multiple ground protective system in place. Grounds were placed in a sump 54 and parts of the tubing (using a screw and wire wrapping as discussed above) throughout system. FIG. 3 shows that there is a significant reduction in the electromagnetic field in the water. Using the multiple ground system, it is now possible to run the high voltage discharge system for several hours continuously without causing problems to the electronic control and monitoring equipment used as part of the water system 12.

Example 2. Bench Trials for Removal of Microorganisms

Four bench-level studies were conducted to determine the efficacy of a non-thermal plasma discharge in water to inactivate microorganisms. It is known that a plasma discharge in water will generate active oxygen species, UV radiation, and pressure field shock waves all of which can inactivate microorganisms. A plasma discharge can be achieved by increasing the electric field in a solution beyond its breakdown voltage. The breakdown voltage is dependent on the conductivity and the dielectric properties of the solution. It has been observed that a relationship exists between the input energy and the log reduction of the microorganisms in the system. It has also been documented that the input energy needed to achieve a one log reduction (known as D-value) in *E. coli* can vary from 14 J/L to greater than 366 J/L. As for experiments with certain species of *pseudomonas*, it has been reported that 85 kJ/L is the average input energy needed to achieve one log reduction.

In a first experimental set, a rod to cylinder electrode configuration was placed in a beaker containing 1,600 mL of water (800 mL of tap water and 800 mL of distilled water). Ozone generated from a Marx generator (from the non-thermal plasma's voltage multiplier) was aerated into a secondary beaker containing 1,600 mL of water (also 800 mL of tap water and 800 mL of distilled water) (beaker #2). For these tests, *Escherichia coli* (*E. coli*) was utilized because of its high susceptibility to inactivation by directed energy methods. For each of the beakers containing 1,600 mL of the described water, 2 mL of a TSB stock solution with a known concentration of suspended *E. coli* was used to inoculate each of the water filled beakers for a final *E. coli* concentration of $4.65 \times 10^6$ cfu/mL (Test #1) and $4.50 \times 10^6$ cfu/mL. For the plasma only beaker test (beaker #1), the cylinder electrode diameter was increased from a ¼ inch (which generated an arc discharge) to a 1 inch size so that a pulsed corona was generated during the discharge. A purpose of this test was to determine which of an arc discharge (which puts more energy into the system, which is preferred) or a pulsed corona results in the most biological inactivation.

As for the ozone treatment only beaker, ozone was pushed through a Marx generator chamber and bubbled into the beaker with the use of an airstone. During the experiments, 25 mL samples were collected independently from each beaker at 0 min., 2 min., 4 min., 10 min., 20 min., and 30 min. and bioassayed for cfu/mL determination. The results of the pulsed corona discharge plasma only test are shown in Table 1 below under Test #1.

A second experiment combined the aerated ozone and a rod to cylinder electrode setup into a single beaker containing 1,600 mL of water (800 mL of tap water and 800 mL of distilled water) (Test #2). For this test, 2 mL of a TSB stock solution with a known concentration of suspended *E. coli* was used to inoculate the water filled beaker for a final *E. coli* concentration of $6.10 \times 10^6$ cfu/mL. The cylinder electrode diameter ¼ inch so that a pulsed spark (pulsed arc discharge) would be generated in the solution during discharge and the ozone generated by a Marx generator was bubbled into the beaker beneath the electrode setup. During the experiment, 25 mL samples were collected at 0 min., 10 min., 30 min., 45 min., and 60 min. and bioassayed for cfu/mL determination. The results are shown in Table 1 below under Test #2.

A third experiment featured a rod to cylinder electrode configuration placed in a beaker containing 1,600 mL of water (800 mL of tap water and 800 mL of distilled water) (Test #3). Ozone generated from a Marx generator (from the non-thermal plasma's voltage multiplier) was aerated into a secondary beaker containing 1,600 mL of water (again 800 mL of tap water and 800 mL of distilled water). For this study, *Escherichia coli* (*E. coli*) was utilized because of its high susceptibility to inactivation by directed energy methods. For each of the beakers containing 1,600 mL of the described water, 2 mL of a TSB stock solution with a known concentration of suspended *E. coli* was used to inoculate each of the water filled beakers for a final *E. coli* concentration of $3.05 \times 10^6$ cfu/mL and $3.40 \times 10^6$ cfu/mL respectively. Similar to the second experiment, the cylinder electrode diameter was lowered so that a pulsed spark (pulsed arc discharge) would be generated in the solution during discharge. As for the ozone treatment only beaker, ozone was pushed through the Marx generator chamber and bubbled into the beaker with the use of an airstone. During the experiment, 25 mL samples were collected independently from each beaker at 0 min., 10 min., 15 min., 30 min., and 45 min. and bioassayed for cfu/mL determination. The results are shown in Table 1 under Test #3.

In a fourth experiment, the aerated ozone was combined with and a rod to cylinder electrode setup into a single beaker containing 2,000 mL of water (1,000 mL of tap water and 1,000 mL of distilled water) (Test #4). For this test, 5 mL of a TSB stock solution with a known concentration of suspended *Pseudomonas putida* was used to inoculate the water filled beaker for a final *Pseudo. putida* concentration of $7.00 \times 10^7$ cfu/mL. Different from the first experiment, the cylinder electrode diameter was lowered so that a pulsed spark (pulsed arc discharge) would be generated in the solution during discharge and the ozone generated by a Marx generator was bubbled into the beaker beneath the electrode setup. During the experiment, 25 mL samples were collected at 0 min., 15 min., 30 min., 45 min., and 60 min. and bioassayed for cfu/mL determination. The results are shown in Table 1.

TABLE 1

Summary of Plasma Effectiveness Studies (Bench-Level Testing)

| Test 1 (E. coli) Plasma Only Study Pulsed Corona Disharge in a beaker with no Ozone | | Test 2 (E. coli) Plasma + Ozone Study Pulsed Spark (Pulsed Arc) Discharge plus Ozone Treatment | | Test 3 (E. coli) Plasma Only Study Pulsed Spark (Pulsed Arc) Discharge in a beaker with no Ozone | | Test 4 (Pseudo. putida) Plasma + Ozone Study Pulsed Spark (Pulsed Arc) Discharge plus Ozone Treatment | |
|---|---|---|---|---|---|---|---|
| Sample 0 min. (Control) 6.67 log (cfu/mL) | Log Reduction | Sample 0 min. (Control) 6.79 log (cfu/mL) | Log Reduction | Sample 0 min. (Control) 6.48 log (cfu/mL) | Log Reduction | Sample 0 min. (Control) 7.00 log (cfu/mL) | Log Reduction |
| 2 min. | 0.15 | 10 min. | 1.28 | 10 min. | 2.74 | 15 min | 0.72 |
| 4 min. | 0.23 | 30 min. | 5.79 | 15 min. | 3.82 | 30 min. | 1.46 |
| 10 min. | 0.40 | 45 min. | 5.14 | 30 min. | 4.20 | 45 min. | 1.55 |
| 30 min. | 0.99 | 60 min. | ≥6.79 | 45 min. | 4.46 | 60 min. | 1.85 |

Figure 4:
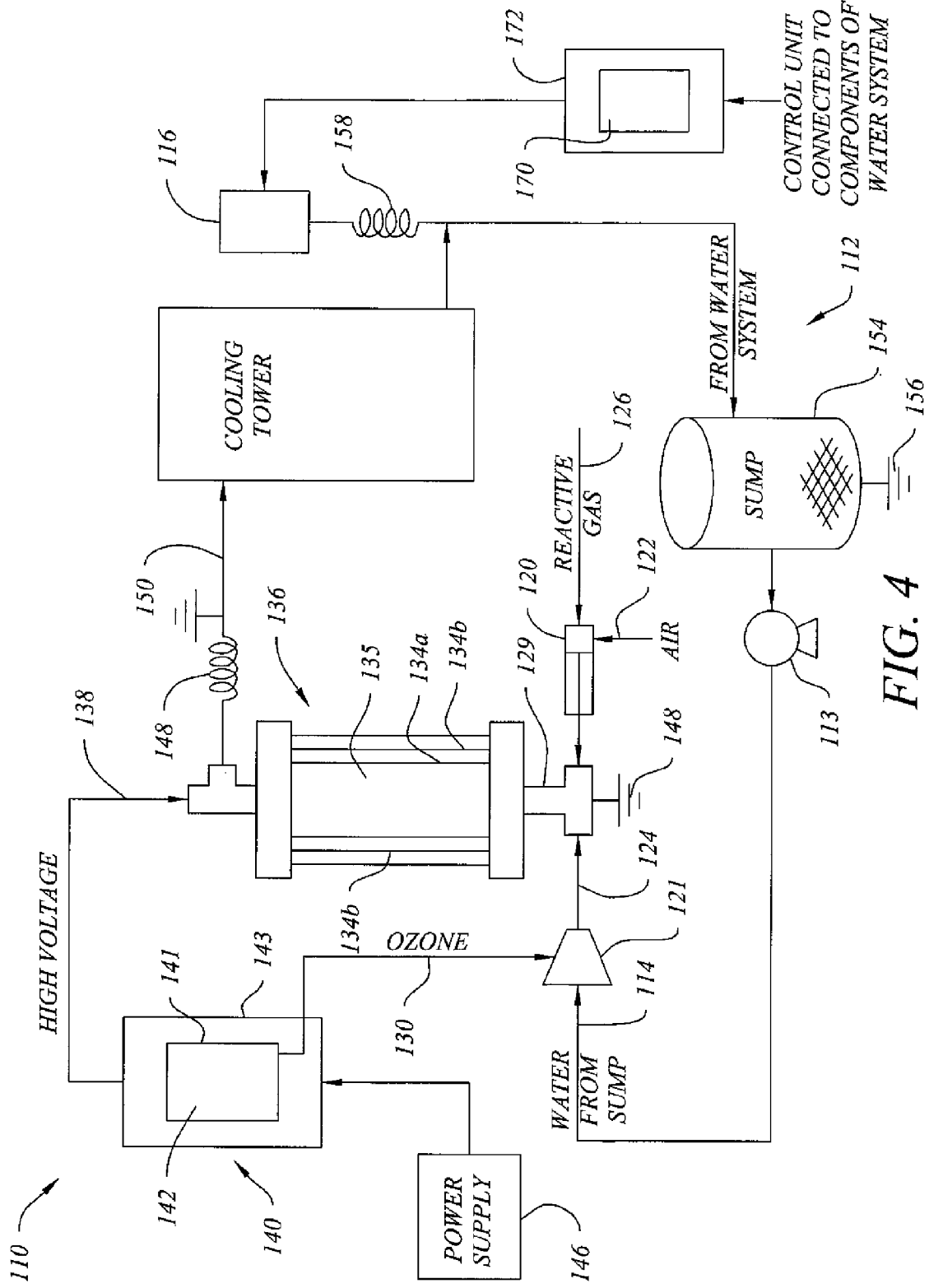
FIG. 4 is a schematic view of another preferred embodiment of a system according to the invention.

Referring to FIG. 4, a field test was also performed using a preferred embodiment of the system and method of the invention. The goal for this field test was to install a plasma water treatment system 110 in a cooling tower water system 112 that used oxidizing biocides to control the microbial population in the water. The cooling tower water system 112 had a total volume of 1,400 gallons and was situated at street level outside the administrative building of a local University. A control unit 115 that monitored water flow and water conductivity was used to control the system blow down and chemical feed into the sump 154. This unit maintained water conductivity between 900 μmhos and 1500 μmhos. The plasma treatment system 110 comprises a high voltage generator 140 and a plasma reaction chamber 136. High voltage generator comprises a Marx ladder or Marx generator 42 disposed within a spark gap chamber 41 within an outer housing 43 that includes a dielectric barrier. Ozone gas stream 130 is withdrawn from spark gap chamber 141 and is injected into inlet water stream 114 via a venturi 121. Although not used initially in this test, air 122 and/or reactive gas 126 could also be injected into the water stream through a micro-bubbler or similar device 120. A tee, mixer, or similar connecting device 129 may be used to infuse stream 124 (containing ozone) with micro-bubbles of air and/or reactive gas from micro-bubbler 120 and provide an inlet into reaction chamber 136. Reaction chamber 136 comprises a sealed, water-tight housing 135 surrounded and shielded by an inner dielectric barrier layer 134a and outer ground shield 134b. The dielectric barrier 34a is a nonconductive layer that prevents arcing to the ground layer 34b, which is a conductive outer layer tied to the ground. Within reaction chamber 136 are disposed a high voltage electrode and a ground electrode which generate a plasma discharge within chamber 136 as voltage generated in high voltage generator 140 is transmitted to the high voltage electrode within chamber 136 via wire 138. Another ground 148 is also disposed in contact with ground layer 134b surrounding housing 135. Reaction chamber 136 in this field test was around 4 inches in diameter. The reaction chamber 136 in this field test was plumbed directly into the existing water lines of water system 112. The reactor inlet 129 was connected to the water line 114 from the high pressure side of the pump 113 which was removing the water from the cooling tower sump 154. A venturi 121 inserted into the line between the pump 113 and the reactor 136 was used to draw ozone gas 130 generated by the Marx ladder 142 into the water being treated. The treated water 150 exiting the reaction chamber 136 was returned to the output side of the chiller where it circulated back into the cooling tower.

When the system 110 was installed initially, none of the recommended precautions or protective measures mentioned in reference to FIG. 1 and treatment system 10 were in place. The system 110 was installed in close proximity to the master control system, it was not grounded, there was no shielding of the controller unit and there were no ferrite beads around the sensors leads for EMI suppression. The high voltage generator 140 was plugged directly into main electrical outlet in the wall.

To start the process, water stream 114 was introduced into the reaction chamber 136 and the high voltage system 140 was activated. Immediately the electromagnetic feedback through the water caused the conductivity meter on the water system 112 to jump to 6000 μmhos, forcing the water system 112 into an immediate blow down mode that resulted in water being dumped to the drain. Without one or more of the protective measures referenced with system 10 of FIG. 1, it would be impossible to effectively operate a high voltage discharge system in a cooling system.

The set-up of systems 110 and 112 were then reconfigured with the water control unit 170 (used to control various components of the water system 112) being isolated within a housing 172 and by clamping ferrite beads 158 around the wires leading to the conductivity sensor 116. Housing 172 encloses system control unit 170 during operation of system 110, but comprises an openable door or a removable cover so that the interior may be accessed for service. Housing 172 is preferably a metal box, but other shielding materials such as plastics, concrete or metal plastic composites may also be used. The high voltage generator 140 was moved to the opposite side of the room from the controller (approximately 12 feet away, and preferably at least 6 feet away) and the power supply 146 was switched from directly connected to the mains to being run through a UPS. The sump 154 in the cooling tower was grounded 156 as was the return (treated) water line 150 grounded by 148. When the system 110 was activated there was no negative impact on the control system 170 or sensor 116, allowing the cooling tower system 112 to operate normally.

Using this set up, the water treatment system 110 was run for 6 months without the addition of biocide. During the process, ozone gas 130 generated in the Marx ladder 142 was introduced into the water entering the reaction chamber 136. This produced a fine stream of bubbles at the high voltage electrode surface. When the water had a low conductivity around 900 μmhos this would be sufficient to generate a plasma discharge, but as the conductivity increased with increasing number of cycles of concentration, this was no longer adequate to generate a plasma discharge in the reaction chamber. Additional air 122 was introduced into the reaction chamber that provided a more robust air curtain between the ground electrode and the high voltage discharge electrode allowing plasma to be generated in water with conductivity in excess of 1500 µmhos. Once the conductivity reaches a pre-set threshold, usually around 1500 µmhos, the cooling tower or other water system goes into blow down mode, dumping the high conductivity water to the drain and replacing it with new water (usually fresh water from a municipal supply, but other water sources with lower conductivity levels may be used).

Figure 5:
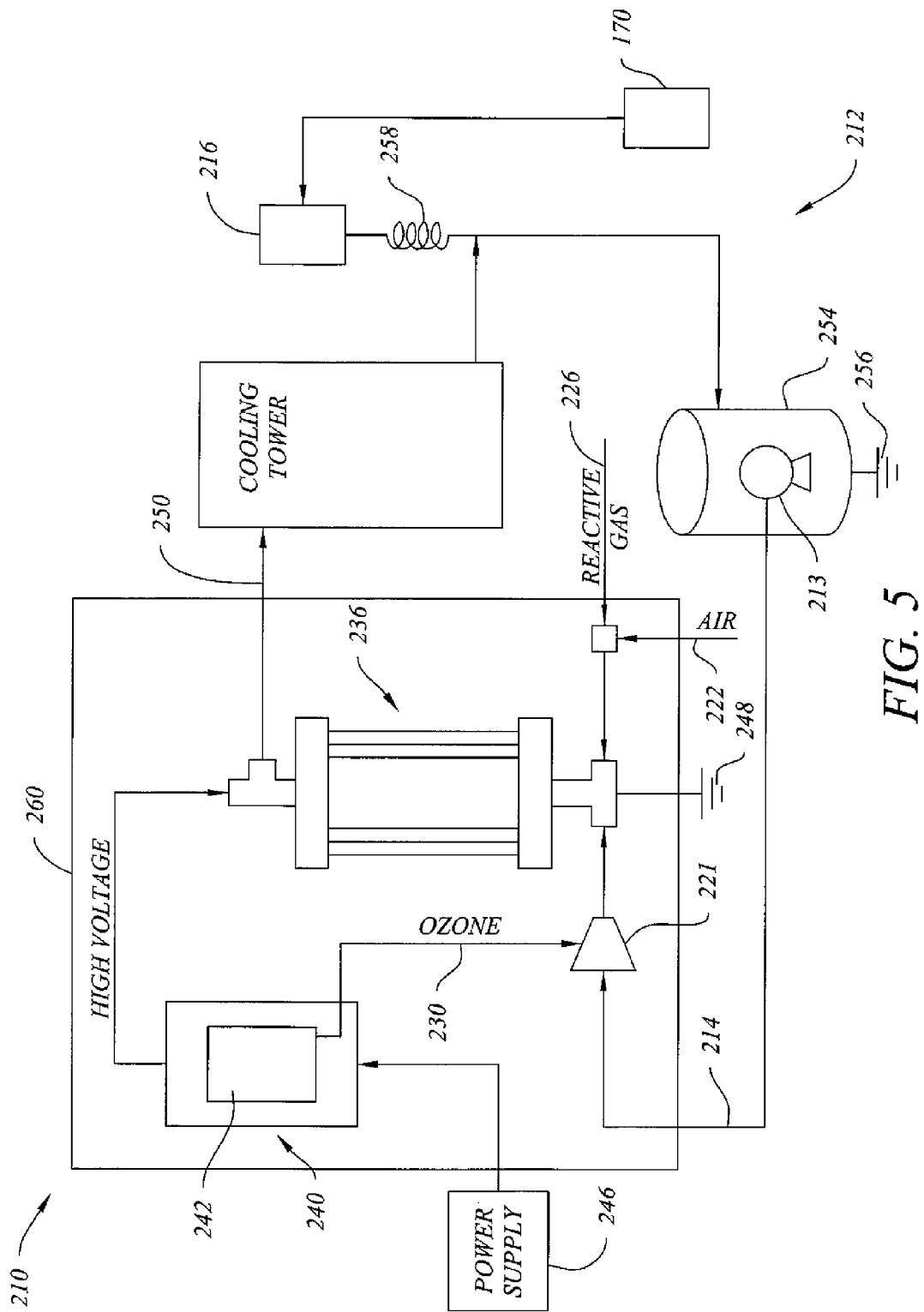
FIG. 5 is a schematic view of another preferred embodiment of a system according to the invention.

Referring to FIG. 5, another preferred embodiment of plasma treatment system 210 was tested in a second field trial. System 210 was installed to treat a 2,200 gallon stainless steel/galvanized cooling tower water system 212. During this installation, the high voltage generator 240 and the plasma reactor chamber 236 were shielded within a housing 260 and placed on the outside wall away from the water control unit 270 and sensors 216 of water system 212. Housing 260 is preferably at least 6 feet away from water control unit 270 and sensors 216. Housing 260 is preferably made of metal, but other materials such as plastic or metal plastic composites may also be used. Housing 260 encloses system 210 during operation, but comprises an openable door or a removable cover so that the interior may be accessed for service. When housing 260 is used, it is not necessary to enclose control unit 170 in a housing (such as housing 172 used with system 110), but such a housing may also be used for added protection of the control unit. The water 214 from the sump 254 was circulated through the plasma reactor using a pump 213 that was placed directly in to the sump 254 which was grounded 256. The high voltage generator 240 was connected directly to the main electrical outlet as power supply 246, but the outlet was on its own breaker circuit. With this set-up, system 210 was able to continuously operate for 6 months (at which time the cooling system was shut-down for winter, but it is believed the system could have continued operating with this embodiment of the invention for a longer period if cooling was needed) without any electrical or EMI issues interfering with operation of water system 212.

Any combination of protective measures, such as a grounded piece of metal or mesh with a large surface area placed within a sump (similar to 56), electromagnetic interference suppressors (such as 58), grounded wire wrapped pipe segments or ferrite beads (such as 52 or 158 or 258), a protective housing (such as 260) around the high voltage generator and plasma reaction chamber, a protective housing around the water control unit (such as 172), locating the high voltage supply and reaction chamber a sufficient distance from the water control unit and sensors, segregated power supply for the high voltage generator (such as an outlet on its own breaker circuit or a UPS or isolation transformer), and/or segregated power supply for the water control unit or sensors (such as a separate UPS or isolation transformer) may be used with any treatment system according to the invention to protect the water system components from any interference or damage and to permit the treatment system to operate continuously for extended periods of time. Any combination of grounding devices may also be used with any treatment system according to the invention to harvest (and to store using capacitors or inductors) excess energy generated by the treatment system and to generate low level energetic fields (electromagnetic or electrochemical) that provide further benefits to the water treatment process.

References herein to water systems include any type of flowing water system, including industrial, commercial, and residential, that requires periodic treatment to control or eliminate growth of microbiological species. Water flowing through the water system may contain contaminants or chemical or biological treatment agents. The components depicted in the figures are not drawn to scale but are merely intended as representations of the various components used in preferred embodiments of treatment systems according to the invention and water systems with which those treatment systems are used. Additionally, certain components of the water systems depicted in the figures may be in other locations relative to other components of the water systems and the systems of the invention than as depicted in the drawings. Those of ordinary skill in the art will appreciate upon reading this specification, that modifications and alterations to the system and methods for treating flowing water with a plasma discharge and ozone while protecting the components of the water systems may be made within the scope of the invention and it is intended that the scope of the invention disclosed herein be limited only by the broadest interpretation of the appended claims to which the inventors are legally entitled.

What is claimed is:

1. A treatment system for treating water in a recirculating water system with a plasma discharge, the treatment system comprising:

a reaction chamber comprising an inlet in fluid communication with part of the water system and configured to receive at least a portion of water from the recirculating water system, an outlet in fluid communication with part of the recirculating water system and configured to return the portion of water back to the recirculating water system, a body, a high voltage electrode, and a ground electrode;

a gas infusion system disposed upstream of the inlet or within the body of the reaction chamber;

a high voltage generator connected to the high voltage electrode;

one or more grounding devices or electromagnetic interference suppressors connected to one or more components of the recirculating water system;

wherein at least a part of the high voltage electrode is configured to contact the water in the body of the reaction chamber while voltage is transmitted from the high voltage generator to generate a plasma discharge in the water; and wherein a conductivity level of the water in the recirculating water system increases as it recirculates and the gas infusion system is configured to begin supplying or increase an amount of gas supplied into the reaction chamber to generate the plasma discharge in the water as the conductivity level increases.

2. The treatment system of claim 1 wherein the gas infusion system comprises one or more of a micro-bubbler, a venturi, a hydrodynamic cavitation system, or sonicating probes.

3. The treatment system of claim 1 further comprising a timer or other controller to periodically activate and deactivate the high voltage generator.

4. The treatment system of claim 1 wherein the high voltage generator comprises a zero volt switching circuit and a Marx generator and generates 200 kv or more for each discharge.

5. The treatment system of claim 4 wherein the plasma discharge is an arc discharge.

6. A treatment system for treating water in a water system with a plasma discharge, the treatment system comprising:
- a reaction chamber comprising an inlet in fluid communication with part of the water system and configured to receive at least a portion of water from the water system, an outlet in fluid communication with part of the water system and configured to return the portion of water back to the water system, a body, a high voltage electrode, and a ground electrode;
- a gas infusion system disposed upstream of the inlet or within the body of the reaction chamber;
- a high voltage generator connected to the high voltage electrode;
- an isolation transformer or uninterruptable power supply connected to the high voltage generator;
- a housing around the high voltage generator for capturing ozone gas produced by the high voltage generator and a conduit for directing the ozone gas to the gas infusion system.

7. A treatment system for treating water in a water system with a plasma discharge, the treatment system comprising:
- a reaction chamber comprising an inlet in fluid communication with part of the water system and configured to receive at least a portion of water from the water system, an outlet in fluid communication with part of the water system and configured to return the portion of water back to the water system, a body, a high voltage electrode, and a ground electrode;
- a gas infusion system disposed upstream of the inlet or within the body of the reaction chamber;
- a high voltage generator connected to the high voltage electrode;
- an isolation transformer or uninterruptable power supply connected to the high voltage generator;
- one or more grounding devices connected to one or more components of the water system;
- wherein the grounding device comprises at least one wire wrapped around a pipe in the water system and wherein the treatment system captures excess energy produced by a high voltage discharge from the high voltage generator to produce a current flow through the wire wrapped around the pipe to create a magnetic field in the water flowing through the pipe.

* * * * *